March 19, 1957   M. G. PAWLEY ET AL   2,786,105
TELEMETERING IN-FLIGHT CALIBRATOR Original Filed July 16, 1952   3 Sheets-Sheet 1

INVENTORS
MYRON G. PAWLEY
LELAND L. PARKER
WALTER A. HERETH
BY
ATTORNEYS

March 19, 1957  M. G. PAWLEY ET AL  2,786,105
TELEMETERING IN-FLIGHT CALIBRATOR
Original Filed July 16, 1952  3 Sheets-Sheet 2

INVENTORS
MYRON G. PAWLEY
LELAND L. PARKER
WALTER A. HERETH
BY
ATTORNEYS

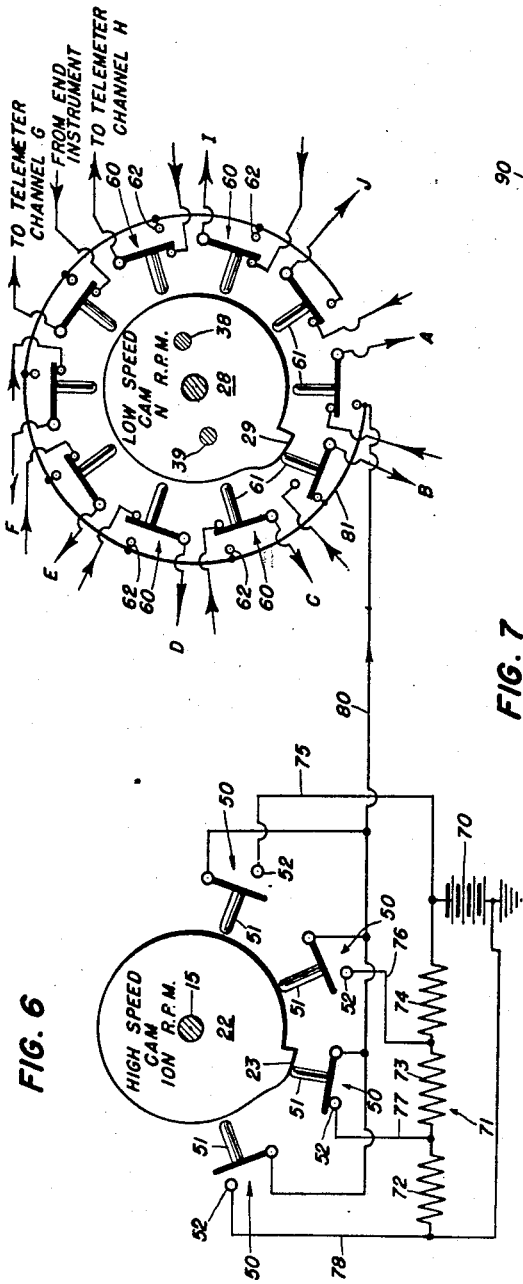
FIG. 6
FIG. 7
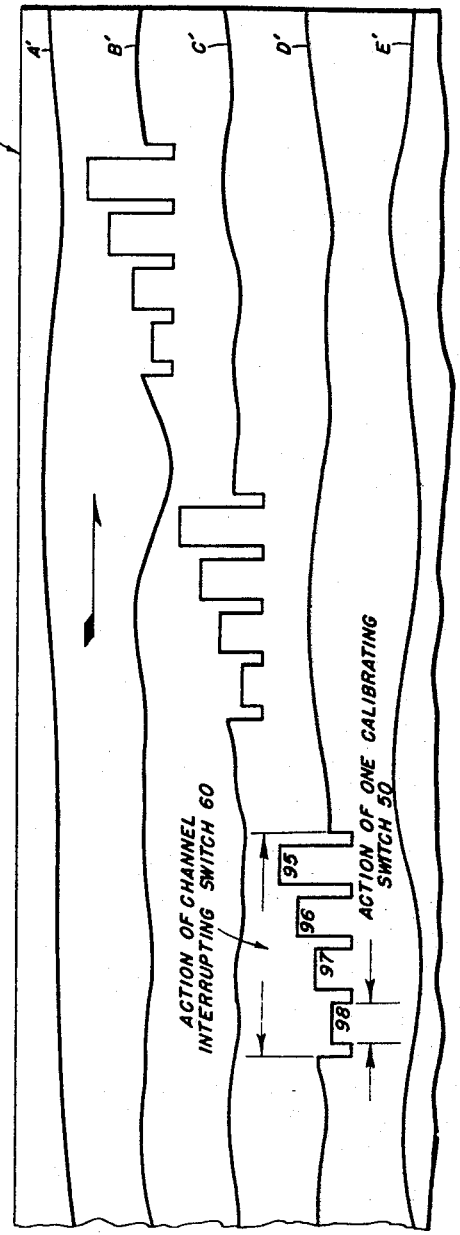
INVENTORS
MYRON G. PAWLEY
LELAND L. PARKER
WALTER A. HERETH

United States Patent Office 2,786,105
Patented Mar. 19, 1957

2,786,105

TELEMETERING IN-FLIGHT CALIBRATOR

Myron G. Pawley and Leland L. Parker, Corona, Calif., and Walter A. Hereth, Clarksville, Md., assignors to the United States of America as represented by the Secretary of the Navy Original application July 16, 1952, Serial No. 299,323, now Patent No. 2,706,287, dated April 12, 1955. Divided and this application November 25, 1953, Serial No. 394,525

4 Claims. (Cl. 200—27)

(Granted under Title 35, U. S. Code (1952), sec. 266)

The invention herein described may be manufactured and used by or for the Government of the United States of America for governmental purposes without the payment of any royalties thereon or therefor.

This invention relates to a calibrating apparatus and more particularly to a device for calibrating the output of guided missile telemetering equipment. This application is a division of copending application Serial No. 299,323, filed July 16, 1952, now Patent No. 2,706,287, dated April 12, 1955.

In determining flight characteristics of guided missiles or other similar devices, radio telemetering is resorted to in order to transmit a number of channels of information from the missile to a remote ground station, during the course of flight. The information is commonly recorded as a number of traces on a moving photographic film or strip of paper which is calibrated in order to make it possible to read the information from any recorded channel by measuring the displacement of the corresponding trace from a suitable base line, such as the edge of the film or paper. However, this method is objectionable because of errors which may readily be introduced by misalignment of the film or changes in channel response due to attenuation of the transmitted signal during the flight of the missile. To eliminate this error the instant invention, during the flight of the missile, supplies to telemeter channel inputs a sequence of known calibrating circuit parameters such as voltages or resistances which are successively switched into each channel input and periodically repeated. During the calibration sequence for any one channel, the other channels remain connected to their respective information sources to transmit continuous intelligence to the remote ground station.

With the foregoing in mind it is an object of this invention to provide a means for accurately calibrating the output of telemetering equipment.

Another object is the provision of a telemetering in flight calibrator which operates sequentially upon a plurality of telemetering channels to introduce therein a series of known voltages.

Still another object is the provision of a simple compact circuit interrupter for sequentially connecting a series of known circuit constants therein.

A further object is to provide a circuit interrupting means which will automatically interject known circuit constants into one of a plurality of telemetering channels without interrupting the transmission of intelligence from the other channels.

Yet another object is to provide a means for supplying a plurality of reference levels which are subjected to the same conditions influencing the level of transmission of the associated telemetering system.

Still another object is the provision of an apparatus for sequentially and periodically introducing known circuit constants into the output of telemetering channels for calibrational purposes.

Other objects and many of the attendant advantages of this invention will become readily appreciated as the same becomes better understood by reference to the following detailed description when considered in connection with the accompanying drawings wherein:

Fig. 6 is a wiring diagram of a telemetering calibrator embodying the present invention; and Fig. 7 is a fragmentary view disclosing a portion of a typical record obtained by the use of the present invention.

Figure 1:
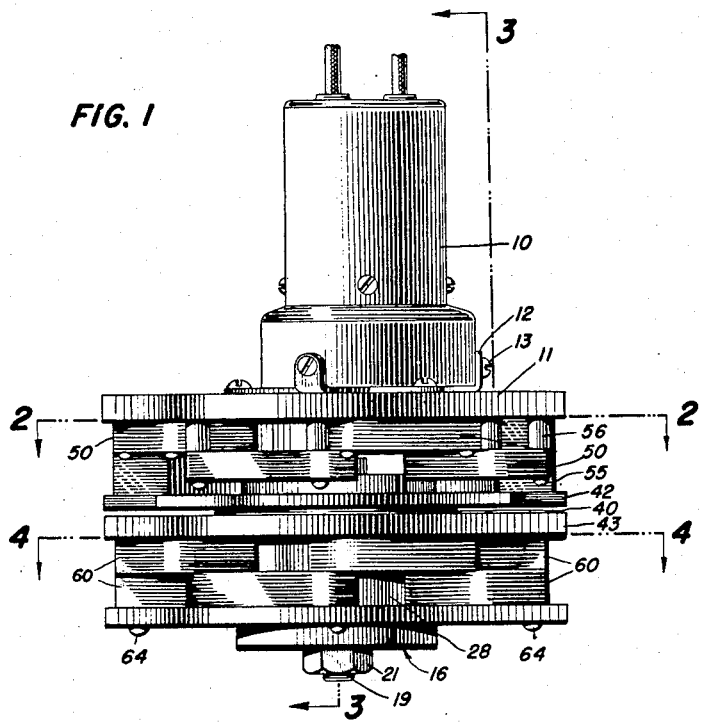
Fig. 1 is a side elevational view of the telemetering in-flight calibrator.

Referring now to the drawings, wherein like reference numerals designate like parts throughout the several views, and more particularly to Figs. 1 to 5, the embodiment illustrated comprises a prime mover 10, which may be an electric motor of the fractional horsepower type, and which may be mounted on a circular supporting plate 11 by means of a bracket 12 and screws 13. The motor 10 may have a built-in speed reduction system housed in the enlarged lower end from which protrudes a stub shaft 14, separably coupled to a coaxial second shaft 15. The lower end of shaft 15 may be supported by a suitable thrust bearing assembly 16 which may be adjustable as shown and includes a bearing housing 17 secured on an end plate 18 in any well known manner. A thrust adjusting screw 19 is recessed at one end thereof to receive a ball bearing 20 and is adapted to be locked in any adjusted position by means of a nut 21.

Rigidly mounted on the stub shaft 14 for rotation therewith is a calibrating switch actuating cam 22 having a flat faced lobe 23 (Fig. 2), and which is secured against lateral displacement by means of a bearing assembly 24. The bearing assembly 24 is comprised of an inner race 25, a plurality of ball bearings 26 and an outer race 27.

A channel input switch actuating cam 28, having a flat faced lobe 29 (Fig. 4), is mounted for rotation about the shaft 15 by means of a bushing 30. The cam 28 is prevented from longitudinal movement on the shaft by means of snap rings 31 and 32 which are mounted in shallow annular depressions 33 and 34, respectively, formed in the shaft 15 and positioned above and below the cam. Rotational movement is transmitted to the cam 28 from the shaft 15 by planetary gear assembly 35 which includes a pair of planet gears 36 and 37. The planet gears 36 and 37 are rotatably mounted on stub shafts 38 and 39, respectively rigidly secured on cam 28, and are driven on a ring gear 40 by means of a sun gear 41 cut in the periphery of shaft 15. The ring gear 40 is mounted between a pair of supporting plates 42 and 43 and clamped rigidly therebetween by means of a plurality of bolts 44. By mounting the actuating cams 22 and 28 in the above-described manner, it is possible to obtain a differential rate of rotational speed therebetween, the ratio of which will be determined by the gear ratios in the planetary gear assembly 35.

Figure 2:
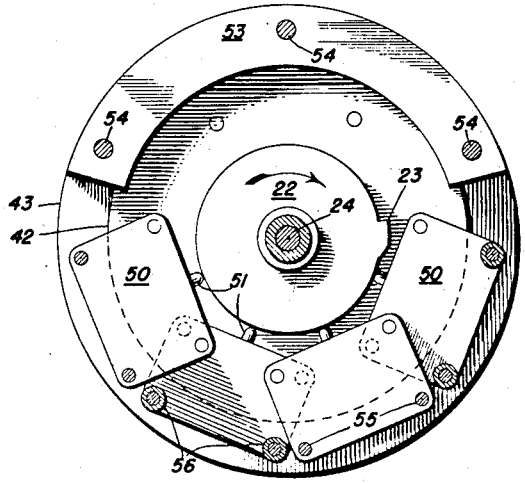
Fig. 2 is a transverse view taken along a line substantially corresponding to line 2—2 of Fig. 1 and showing a bank of calibration input switches and associated cam actuator.
Figure 3:
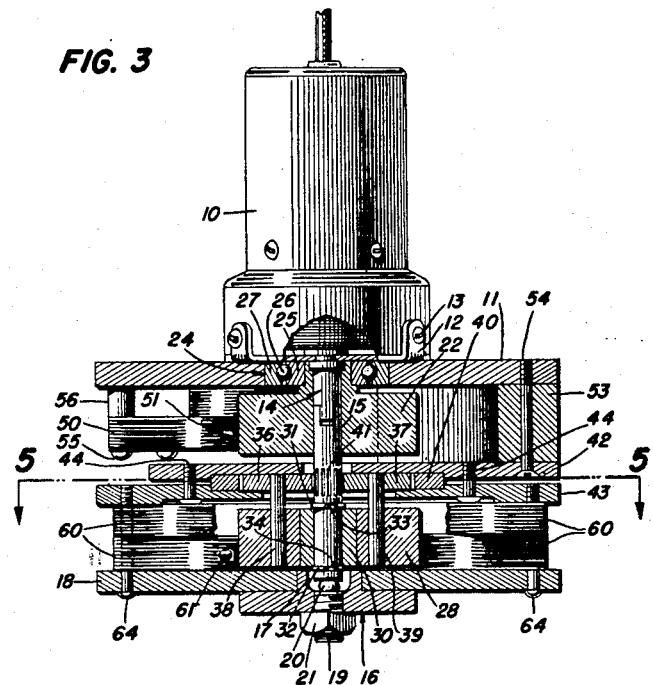
Fig. 3 is a longitudinal sectional view taken along a line substantially corresponding to line 3—3 of Fig. 1 and disclosing the relationship between the bank of calibration switches and a bank of channel switches and their respective cam actuators.

Mounted on the underside of the plate 11 are a plurality of calibrational switches 50, which may be of the microswitch type, having movable levers or contacts 51 and fixed input contacts 52 (Fig. 6). The switches 50 are located within a chamber formed by the plates 11 and 42 which are maintained in their specific relationship by a semicircular retaining wall member 53 (Fig. 2) and a plurality of bolts 54. In order to conserve space the microswitches 50, which in this preferred embodiment are of the single pole single throw type, are alternately mounted on two levels and secured to the supporting plate 11 by means of bolts 55 and spacers 56 which may be required to maintain the aforesaid staggered relationship. The movable or actuating levers 51 of the switches 50 are directed radially inwardly so as to be in a position to be contacted by the lobe 23 of the actuator cam 22 (Fig. 2).

Figure 4:
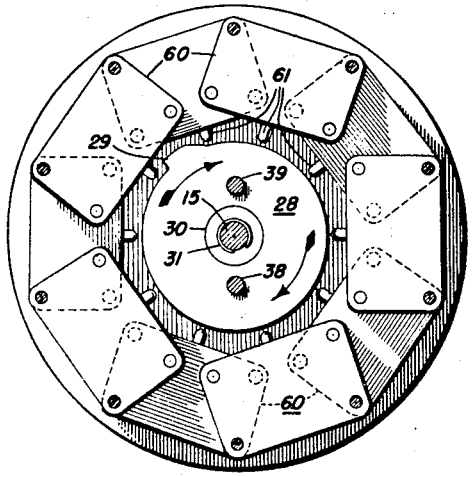
Fig. 4 is a transverse sectional view taken along a line substantially corresponding to line 4—4 of Fig. 1 and showing a bank of telemetering channel input switches and associated cam actuator.
Figure 5:
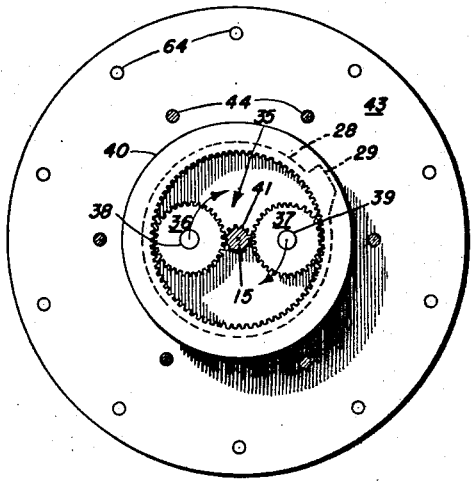
Fig. 5 is a transverse sectional view taken along a line substantially corresponding to line 5—5 of Fig. 3 and disclosing the speed reducing planetary gear system which interconnects the main drive shaft and the input channel switch actuator.

A plurality of channel input switches 60, which may be of the microswitch type, having actuating levers or contacts 61, fixed input contacts 62 and fixed output contacts 63 (Fig. 6), are mounted between plates 43 and 18 and secured therebetween by means of bolts 64. The switches 60, which in this preferred embodiment are of the single pole double throw type, are alternately mounted on two levels encircling the shaft 15 and having their respective push button actuating levers 61 directed radially inwardly so as to be in a position to be contacted by the actuating lobe 29 of the rotating switch actuator cam 28 (Fig. 4). The rotational timing of cams 22 and 28 is such that all of the switches 50 are sequentially closed and opened once during the period that any one switch 60 is being actuated. In other words, the gear reduction ratio of the planetary system 35 is such that for one revolution of cam 28 the cam 22 makes as many revolutions as there are switches 60 utilized in the system; that is, if, as shown in the preferred embodiment, ten switches 60 are used, the reduction is ten to one.

Referring now to Fig. 6, in which one embodiment of a telemetering in-flight calibrator is schematically represented, there is disclosed a source of calibrating potential 70 electrically connected across a voltage divider 71 which is comprised of a plurality of resistances 72, 73, and 74 of a predetermined fixed value. The calibration input switches 50 are electrically connected to different junctions of the voltage divider 71 by means of leads 75, 76, 77 and 78 so that a different voltage level, corresponding to the positions selected on the voltage divider, will appear at each input contact 52 of the switches. The actuating levers or contacts 51 of the calibrating switches 50 are connected in parallel to a common output circuit 80 which is connected with the calibration input contacts 62 of the channel switches 60. The input contacts 62 are electrically interconnected by strapping leads 81 so that the output of the calibrator switches 50 will simultaneously appear at each of the contacts as the calibrator switches are sequentially actuated by the cam 22.

The actuating levers 61 of the channel switches 60 are shown connected to individual telemetering channels designated A through J and are normally closed to engage contacts 63 each of which is individually connected to a separate remote end instrument (not shown) which supplies a signal corresponding to missile in-flight characteristics being transmitted to a ground station. The missile in-flight characteristic signals may be recorded at the ground station in any suitable fashion as is well known in the art and for the purpose of illustrating the present invention may be put on a tape or strip such as the strip 90 (Fig. 7) which may be of a photo-sensitive material. As shown the signals appear as undulating lines A′ through E′ which traverse the strip and are representative of intelligence derived from the end instruments associated with channels A through E, respectively. It is to be understood that all ten channels are simultaneously recorded, however, for the purpose of this description, only five of the ten channels are shown recorded.

These in-flight characteristics are normally transmitted through all channels except the one whose associated channel switch 60 has been closed by engagement of the lobe 29 of cam 28 with the switch lever 61 to close a circuit through the telemeter channel transmitter, the output circuit 80 of the calibrator switches 50, and the channel input contact 62. During the time interval that any particular channel switch lever 61 is closed upon its respective input contact 62, the calibrator switch actuating cam 22 makes one complete revolution sequentially closing all calibrator switches 50 for a predetermined time interval, which is dependent upon the length of its flat faced lobe 23.

The output of the calibrator switches 50 appears as a series of substantially square wave pulses 95, 96, 97 and 98, each having a voltage value which is initially determined by the circuit constants selected by the voltage divider 71. The recorded pulses 95, 96, 97 and 98 provide reference levels necessary for determining the relative values of the recorded missile flight characteristic function traces A′ through E′ and also readily discloses any attenuation of the signals transmitted from the telemetering device which may be introduced as the missile increases its distance from the ground station.

In the embodiment, shown the values or voltage levels of the pulses 95, 96, 97 and 98 have been selected at 3, 2, 1 and 0 volts respectively. However it will be readily apparent that any suitable voltage levels may be obtained by merely changing the circuit constants of the voltage divider 71. This, of course, will be determined by the average value of the output signal from the telemetering transmitter. Further, depending upon the requirements of accuracy desired, the number of reference voltage pulses may be varied by increasing or decreasing the number of calibrating switches 50 and providing a like number of voltage taps on the voltage divider 71.

Obviously many modifications and variations of the present invention are possible in the light of the above teachings. It is therefore to be understood that within the scope of the appended claims the invention may be practiced otherwise than as specifically described.

What is claimed is:

1. A circuit interruptor for a telemetering in-flight calibrator comprising a base, a driving means mounted on said base and including a shaft, a first bank of switches mounted on said base about said shaft, a switch actuating cam secured on said shaft for rotation therewith to sequentially actuate said switches, a second bank of switches mounted about said shaft and longitudinally displaced from said first bank of switches, actuating means mounted on said shaft for sequentially actuating said second switches, and a planetary gearing system connected between said shaft and said actuating means for rotating said actuating means at a rate such that one switch of said second bank of switches may be operated during the operation of all the switches of said first bank of switches.

2. A circuit interruptor for a telemetering in-flight calibrator comprising a base, a driving means mounted on said base and including a shaft, a first bank of switches mounted on said base about said shaft, a first cam secured on said shaft for rotation therewith to sequentially actuate said switches, a second bank of switches mounted about said shaft and longitudinally displaced from said first bank of switches, a second cam rotatably mounted on said shaft for sequentially actuating said second switches, and a planetary gearing system having a sun gear formed on said shaft and planet gears connected with said second cam for rotating the cam at a rate such that one switch of said second bank of switches may be operated during the operation of all the switches of said first bank of switches.

3. A circuit interrupter for a telemetering in-flight calibrator including a plurality of known circuit parameters comprising a base, a driving means mounted on said base and including a stud shaft, a second shaft rigidly connected with said stub shaft and having a gear formed integral therewith, a first bank of switches for connection to said circuit parameters mounted on said base about said shaft, a first cam secured on said shaft for rotation therewith to sequentially actuate said switches, a second bank of switches for electrical connection with said first bank of switches mounted about said shaft and longitudinally displaced from said first bank of switches, a second cam mounted for rotation on said shaft for sequentially actuating said second switches, a ring gear, a pair of planet gears in engagement with said ring gear and said shaft gear and connected to said second cam for rotating it at a rate such that one switch of said second bank of switches may be operated during the operation of all the switches of said first bank of switches to connect electrically the known circuit parameters therewith.

4. A circuit interrupter for a telemetering in-flight calibrator comprising a base, a driving means mounted on said base and including a shaft, a first bank of single-throw switches mounted on said base about said shaft, a switch actuating cam secured on said shaft for rotation therewith to sequentially actuate said switches, a second bank of double-throw switches mounted about said shaft and longitudinally displaced from said first bank of single-throw switches, actuating means mounted for rotation on said shaft for sequentially actuating said second bank of double-throw switches, and speed reducing means connected between said shaft and said actuating means for rotating said actuating means at a rate such that one double-throw switch of said second bank of double-throw switches may be operated during the operation of all the single-throw switches of said first bank of single-throw switches.

References Cited in the file of this patent
UNITED STATES PATENTS

| | | |
|---|---|---|
| 2,454,882 | Oakley | Nov. 30, 1948 |
| 2,551,943 | Gulow | May 8, 1951 |
| 2,582,285 | Schellens | Jan. 15, 1952 |